Patented Nov. 28, 1939

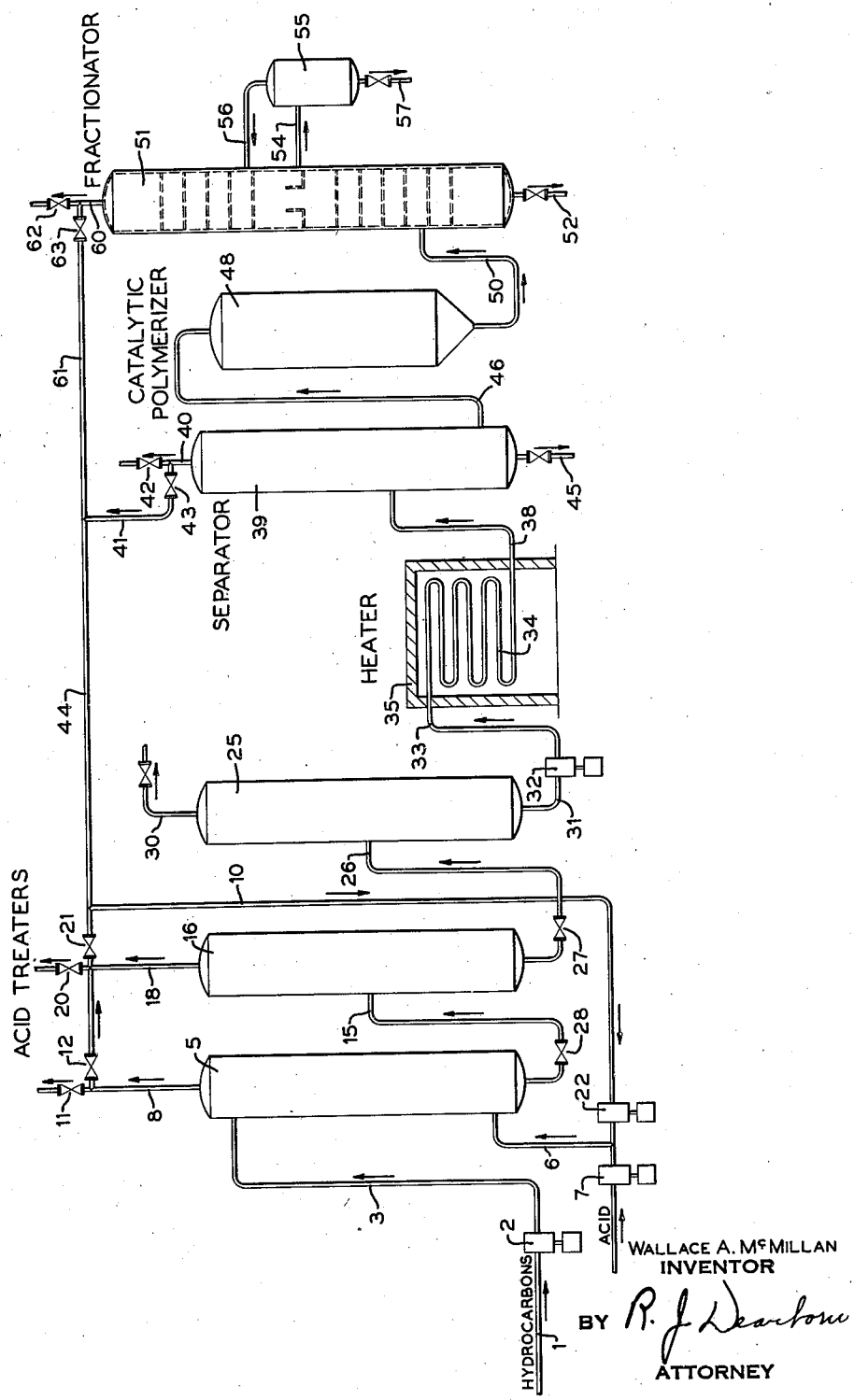

2,181,642

UNITED STATES PATENT OFFICE 2,181,642

POLYMERIZATION OF TERTIARY-BASE OLEFINS

Wallace A. McMillan, Beacon, N. Y., assignor to The Texas Company, New York, N. Y., a corporation of Delaware Application July 14, 1937, Serial No. 153,543

5 Claims. (Cl. 260—683)

This invention relates to the polymerization of tertiary-base olefins and has to do particularly with a process for the selective removal and polymerization of tertiary-base olefins from hydrocarbon mixtures containing mixed normal and tertiary-base olefins, such as hydrocarbon fractions containing paraffins and olefins of the same number of carbon atoms to the molecule.

The invention is concerned specifically with the selective removal and polymerization of isobutylene to di-isobutylene which may be utilized, preferably after hydrogenation to iso-octane, in the preparation of motor fuels. In the preparation of di-isobutylene from unsaturated hydrocarbon fractions, such as cracked normally gaseous hydrocarbons from petroleum, two general processes have been used heretofore.

One method has depended on the selective polymerization of isobutylene at relatively low temperatures in the presence of phosphoric acid catalyst in liquid or solid form, whereby one molecule of isobutylene reacts with another molecule of the same substance to form a dimer, or one molecule of isobutylene reacts with another molecule of normal butene to form a compact iso molecule. In general, it has been found in plant practice that isobutylene reacts with normal butylene in the ratio of one mol of isobutylene to between 1.1 and 1.7 mols of normal butylene.

Another method which has been used depends on the selective absorption of isobutylene in sulfuric acid of about 60-70% strength and then the polymerization of the isobutylene by heating the acid solution and subsequently separating the acid by decantation. The purpose of this method is to remove the very reactive tertiary butylene at such temperatures as to avoid substantial conversion of the normal butylenes.

According to the present invention, a process has been found which is essentially different from those of the prior art and depends upon a method of operation involving an entirely different type of reaction from prior methods.

Essentially the process of the present invention consists of reacting hydrogen chloride with liquefied butylenes whereby the isobutylene forms tertiary butyl chloride and the other butylenes are not affected. The tertiary butyl chloride and unreacted hydrogen chloride are subsequently removed by ordinary fractionation from the unreacted hydrocarbons and separated into hydrogen chloride, which can be returned to the process, and the tertiary butyl chloride which is further treated. The operation to this point accomplishes the step of removing the very reactive isobutylene and leaves the other butylenes in mixture with relatively unreactive butanes for use in chemical manufacture or polymerization by other known or preferred methods. The isobutyl chloride, after separation, is decomposed into isobutylene and hydrogen chloride, for example by heating. The resulting mixture, ordinarily in the gaseous state, can then be polymerized in the presence of a suitable polymerization catalyst.

Each of the above outlined steps provides a practical method of operation. It has been found that the selective reaction of liquefied isobutylene with anhydrous hydrogen chloride is clean cut and that other butylenes do not react at a measurable rate, whereas isobtylene reacts completely and almost instantaneously. It is preferable to use anhydrous hydrogen chloride gas although other methods of reaction with hydrogen chloride are contemplated within the scope of the invention but usually require the employment of a catalyst.

The tertiary butyl chloride formed in the reaction boils at 51° C. (124° F.) at atmospheric pressure which leaves a good separation in boiling point from butane and the remaining butylenes and permits almost perfect fractionation. Hydrogen chloride can easily be separated since its boiling point is —83° C. (—117° F.) at normal pressure.

The tertiary butyl chloride has been found to decompose when heated to about 260° C. (500° F.) in a clean gaseous uni-molecular reaction giving substantially only isobutylene and hydrogen chloride. This mixture may be easily polymerized by passing the mixture over a phosphorus pentachloride, or aluminum chloride, or zinc chloride type of catalyst and the hydrogen chloride then removed from the polymer and returned to the process. Also good catalysts such as phosphoric acid, sulfuric acid, etc., may be used, but in the latter cases it may be desirable to separate the hydrogen chloride prior to polymerization.

The invention will be further described in connection with the accompanying drawing showing a diagrammatic sketch of one form of apparatus for carrying out the process of the invention.

Referring to the drawing, hydrocarbon feed stock which may be any hydrocarbon mixture containing both tertiary-base and normal olefins is charged to the system from a suitable source of supply, not shown, through the line 1. It is preferable to use an unsaturated hydrocarbon fraction, such as one obtained from cracking petroleum oils or gases, and containing hydrocarbons of more than 3 carbon atoms per molecule, such as a $C_4$ unsaturated hydrocarbon fraction. A suitable starting material may be an overhead from cracked or polymer gasoline stabilizers containing 20–30% of unsaturated $C_4$ hydrocarbons or the overhead from debutanizers used for treating cracked distillates from cracking stills, and containing 50% or more of unsaturated $C_4$ hydrocarbons.

The charging stock is preferably compressed sufficiently to maintain a liquid phase and forced by the pump 2 through line 3 into the upper portion of contact tower or absorber 5. This tower may be of conventional design and it is intended to provide intimate liquid and gas contact. The hydrocarbons pass downwardly through tower 5 and in so doing pass countercurrent and in intimate contact with hydrogen chloride which is introduced into the lower portion of the tower 5 through the line 6 by means of the pump 7. It is preferable to use the hydrogen chloride as a dry gas in which condition it unites almost instantaneously with the tertiary-base olefins without the aid of a catalyst. Sufficient hydrogen chloride is introduced to insure complete reaction with tertiary-base olefins. Usually it is convenient to maintain an excess of hydrogen chloride which may be removed from the top of the tower through the line 8 and may be discharged from the system, but it is usually desirable to recirculate the hydrogen chloride through the line 10 by keeping the valve 11 in line 8 closed and the valve 12 open.

The mixture of unreacted hydrocarbons and tertiary alkyl chloride is withdrawn from the bottom of the tower through the line 15 and introduced into the separator or fractionator 16. In the separator 16 substantially all of the hydrogen chloride is separated and removed from the top of the separator through the line 18 and may be discharged from the system or recirculated through the line 10 by suitable manipulation of valves 20 and 21. A pump 22 is provided in line 10 to aid in the recirculation. Liquids are removed from the bottom of the separator 16 and introduced into fractionator 25 by means of the line 26. A substantial superatmospheric pressure, for example around 50–150 pounds, is preferably maintained on the absorber 5 and separator 16 or a differential pressure may be maintained between the towers 5 and 16 by manipulation of the valve 28 in the line 15. It is preferable to maintain a substantially lower pressure in the fractionator 25 than in the towers 5 and 16 and this may be done by releasing the pressure through the valve 27 located in line 26. A pressure of around atmospheric or somewhat above may be maintained in the fractionator 25. It is intended in the fractionator 25 to separate the tertiary alkyl chloride from the unreacted hydrocarbons by fractionation. The unreacted hydrocarbons are separated and withdrawn from the top of the tower 25 in a vapor state through vapor line 30 and may be recirculated to the feed line 1 or disposed of otherwise, for example for fuel or charge to a thermal or catalytic polymerization unit.

The tertiary alkyl chlorides having sufficiently high boiling point to remain in the liquid state at ordinary temperatures are withdrawn from the bottom of the fractionator 25 through the line 31 by the pump 32 and forced through the line 33 to the heating coil 34, located in the furnace setting 35. In the heating coil 34 it is intended to decompose the tertiary alkyl chlorides whereby the hydrogen chloride and tertiary-base olefins are regenerated. This may be done by controlling the conditions whereby a unimolecular decomposition of the products occurs. A suitable temperature for this purpose is around 500° F. The decomposition products are transferred through the line 38 to a separator 39 wherein all or a portion of the hydrogen chloride may be separated and released from the top thereof through the valve controlled line 40 or by by-pass through the branch line 41 by suitable regulation of the valve 42 in the line 40 and valve 43 in the line 41. In case the hydrogen chloride is by-passed through the branch line 41 it may be recirculated to the system through line 44 and line 10, referred to heretofore.

The degree of separation of the hydrogen chloride in the separator 39 will depend somewhat on the nature of the catalyst subsequently employed in the polymerization of the tertiary-base olefin. In case a catalyst is employed with which the hydrogen chloride does not interfere, it is unnecessary to make a separation of the hydrogen chloride in the separator 39 and this separator may, under such circumstances, be by-passed, if desired. Catalysts such as phosphorus chloride, or metallic chlorides, such as zinc or aluminum chlorides, are less sensitive to hydrogen chloride, and in some cases, it may be advantageous to include the hydrogen chloride in the gases to be subjected to polymerization. In some cases it may be advantageous to use a catalyst, such as boron-trifluoride alone or in the presence of a metal such as nickel, as a catalytic material and often the presence of hydrogen chloride is a distinct advantage in the catalytic action of such a catalyst.

If the conditions are properly maintained in the heater 34 the decomposition into hydrogen chloride and tertiary-base olefin may be clean cut and without substantial formation of other products as a result of side reactions. However, in case other materials are formed, particularly those of high boiling character, these products may be separated in the separator 39 and withdrawn from the bottom thereof through the valve controlled line 45. The tertiary-base olefins, with or without the presence of hydrogen chloride, depending on the nature of the separation in the separator 39, are transferred through the line 46 to the catalytic polymerizer 48. A temperature of about 250–450° F. is ordinarily maintained on the products passing through the catalytic polymerizer and this temperature may be maintained by suitable lagging on the separator 39 or other means, such as heater or cooler or heat exchanger in the line 46. The catalyst chamber 48 is intended to be used with a solid or liquid catalyst and suitable mechanical means may be installed in the chamber to provide adequate contact between catalyst and the olefins to be polymerized. It is intended that the reaction in the polymerizer 48 be such as to produce chiefly dimers, which in the case of polymerization of isobutylene would be di-isobutylene.

The polymerization products are passed from the bottom of the catalytic tower 48 through the line 50 to fractionator 51. In this fractionator the higher boiling polymerization products are fractionated out and removed from the bottom thereof through the valve controlled line 52. The dimers are also fractionated out and removed as a side stream through the line 54 and are preferably passed through a reboiler 55 from which any undesirable low boiling products, including the hydrogen chloride if any, may be returned to the fractionator through the vapor line 56. The polymer consisting mainly of dimers, for example di-isobutylene, are withdrawn from the reboiler 55 through the valve controlled line 57 for further treatment, such as hydrogenation, to produce iso-octane. The low boiling products consisting mainly of hydrogen chloride are released from the top of the tower through the line 60 and may be released from the system or recirculated through the lines 61, 44 and 10 by suitable regulation of valve 62 in line 60, and valve 63 in line 61.

As an example of the operation of the invention, a $C_4$ unsaturated fraction from cracking still gases was contacted in the liquid state with dry hydrogen chloride gas at ordinary temperatures and under a pressure of about 100 pounds per square inch. The reaction products were flashed into a separator and the excess hydrogen chloride removed and recirculated to the system. The products of reaction were then fractionated under reduced pressure to remove as vapors the unreacted hydrocarbons and a liquid fraction comprising tertiary butyl chloride. The tertiary butyl chloride was then heated to about 500° F. for sufficient time to decompose the alkyl chloride into hydrogen chloride and isobutylene. A major portion of the hydrogen chloride was separated from the isobutylene and the latter passed at a temperature of about 350° F. in contact with liquid phosphorus penta-chloride to polymerize the isobutylene to di-isobutylene. The resulting product was fractionated and a liquid polymer consisting essentially of di-isobutylene was recovered.

The advantage of the process of the present invention is that it is highly selective for the removal and polymerization of isobutylene and provides a convenient method for obtaining a di-isobutylene product which on hydrogenation produces a mixture of 2.2.3 and 2.2.4 trimethyl pentanes which have an octane rating of 100 or above.

Obviously many modifications and variations of the invention, as hereinbefore set forth, may be made without departing from the spirit and scope thereof and therefore only such limitations should be imposed as are indicated in the appended claims.

I claim:

1. A process for the manufacture of di-isobutylene from tertiary butyl chloride, which comprises decomposing the tertiary butyl chloride into isobutylene and hydrogen chloride at an elevated temperature, lowering the temperature slightly, and then subjecting the resulting mixture, without the separation of hydrogen chloride, to polymerization in the presence of a polymerization catalyst immune to hydrogen chloride poisoning.

2. A process for the manufacture of di-isobutylene from tertiary butyl chloride, which comprises decomposing the tertiary butyl chloride into isobutylene and hydrogen chloride at temperatures of about 500° F. and then subjecting the resulting product, without the separation of hydrogen chloride, to polymerization at temperatures of about 250 to 450° F. in the presence of a polymerization catalyst immune to hydrogen chloride poisoning.

3. A process according to claim 2 in which the polymerization catalyst is phosphorous pentachloride.

4. A process for the manufacture of di-isobutylene from an unsaturated $C_4$ hydrocarbon fraction containing isobutylene, which comprises selectively converting the isobutylene into tertiary butyl chloride by contacting the hydrocarbons in the liquid phase with dry hydrogen chloride, separating the tertiary butyl chloride by fractionation, decomposing the isobutyl chloride to isobutylene and hydrogen chloride at an elevated temperature, lowering the temperature slightly, polymerizing the isobutylene to di-isobutylene with the aid of a catalyst possessing active polymerization properties in the presence of hydrogen chloride, separating and recycling the hydrogen chloride for contact with additional $C_4$ hydrocarbons.

5. A process for the manufacture of di-isobutylene from an unsaturated $C_4$ hydrocarbon fraction containing isobutylene, which comprises selectively converting the isobutylene into tertiary butyl chloride by contacting the hydrocarbons in the liquid phase with dry hydrogen chloride, separating the tertiary butyl chloride by fractionation, decomposing the isobutyl chloride to isobutylene and hydrogen chloride, under the influence of heat, subjecting the resulting mixture while hot and at a slightly reduced temperature to polymerization in the presence of a catalyst immune to hydrogen chloride poisoning, whereby the isobutylene is polymerized to di-isobutylene, separating the di-isobutylene from the hydrogen chloride and recycling the hydrogen chloride for conversion of additional isobutylene to tertiary butyl chloride.

WALLACE A. McMILLAN.